March 12, 1940.  I. T. THOMPSON  2,193,525
AUTOMATIC TRANSMISSION
Filed Jan. 8, 1938  3 Sheets-Sheet 2

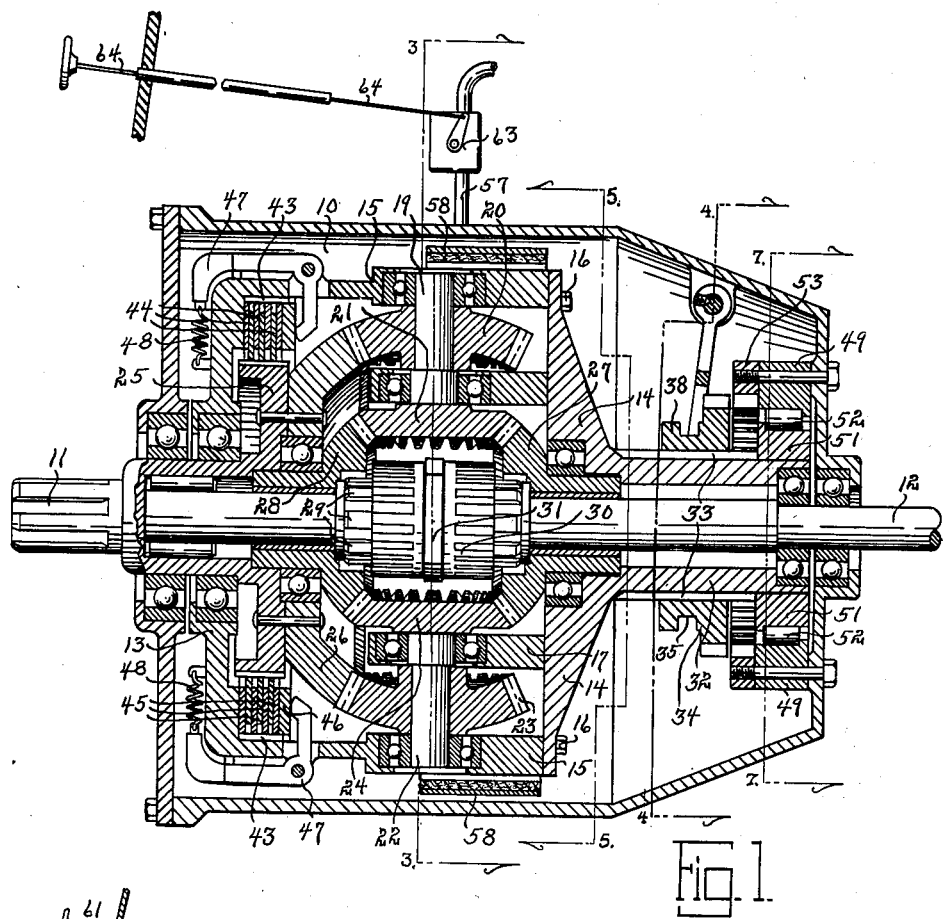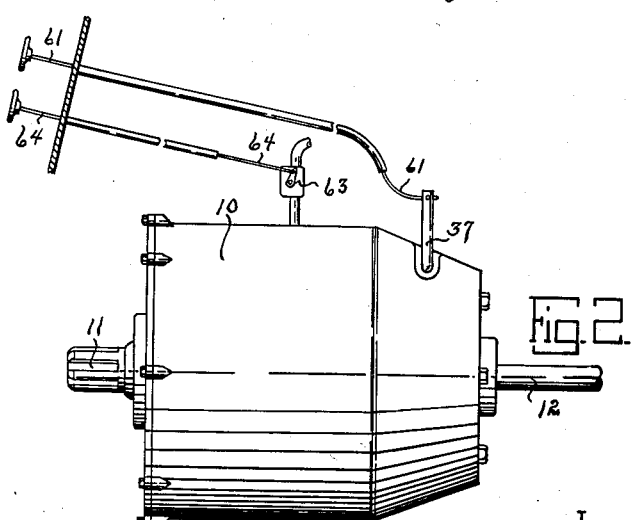

INVENTOR.
Iylo T. Thompson
BY
M. Talbert Dick
ATTORNEY.

March 12, 1940.   I. T. THOMPSON   2,193,525
AUTOMATIC TRANSMISSION
Filed Jan. 8, 1938   3 Sheets-Sheet 3
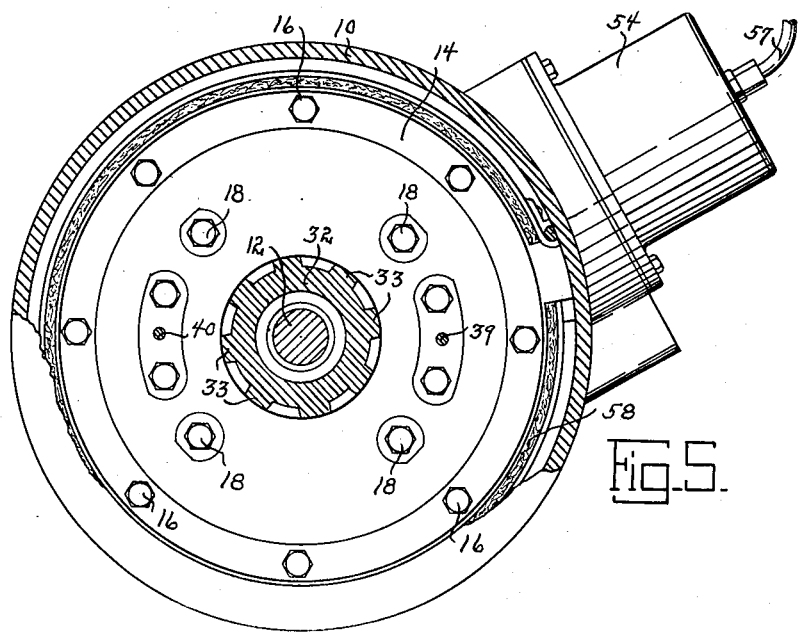
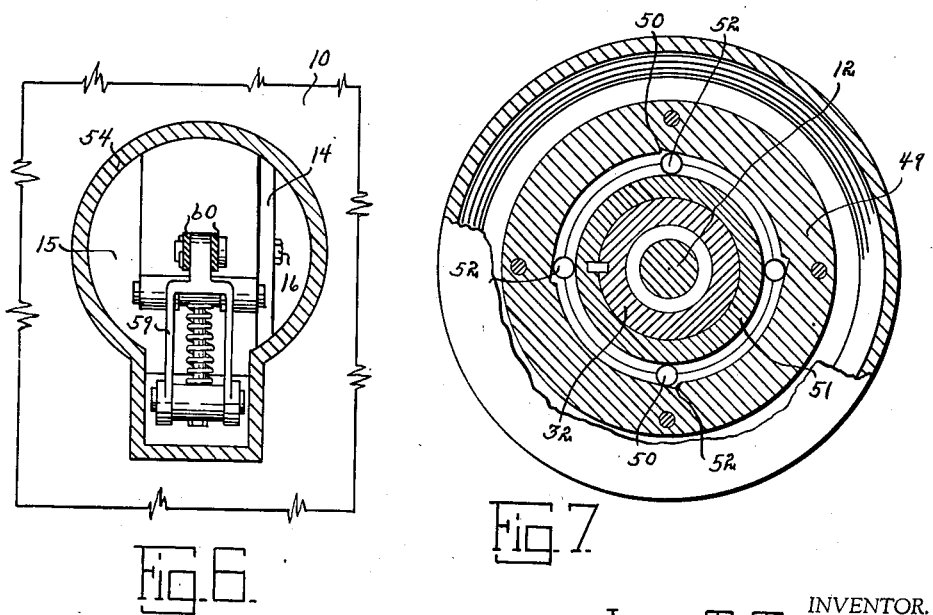
INVENTOR.
Iylo T. Thompson
BY M. Talbert Dick
ATTORNEY.

Patented Mar. 12, 1940

2,193,525

UNITED STATES PATENT OFFICE 2,193,525

AUTOMATIC TRANSMISSION

Iylo T. Thompson, Des Moines, Iowa

Application January 8, 1938, Serial No. 184,039

12 Claims. (Cl. 74—260)

This invention relates to transmissions and more particularly to transmissions for automotive vehicles such as trucks, busses, automobiles, and the like and has for its principal object the providing of a transmission that may be easily placed in "low" gear and when in such gear can be caused to automatically shift itself to "high" gear without the performing of any manual operation by the operator of the vehicle except that of the fuel foot feed of the vehicle, and will return from such "high" gear to "low" gear automatically when desired by the mere actuation of the fuel foot feed of the vehicle.

A further object of my invention is to provide an automatic speed transmission that is always in at least one gear from the time it is manually placed in "low" gear.

A still further object of this invention is to provide an automatic transmission that functions comparatively quietly and does not necessitate the actuating of the vehicle clutch when changing from one gear to the other.

A still further object of this invention is to provide an automatic transmission that may manually selectively be caused to maintain operation of the transmission in a low gear.

A still further object of my invention is to provide an automatic transmission that is light, simple in construction, economical in manufacture, and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side cross-sectional view of my transmission showing its interior construction.

Fig. 2 is a side view of my complete transmission ready for use.

Fig. 5 is a cross-sectional view of the device taken on the line 5—5 of Fig. 1.

Fig. 6 is a cross-sectional view of the brake operating mechanism taken on the line 6—6 of Fig. 3.

Fig. 7 is a cross-sectional view of the one-way braking mechanism taken on the line 7—7 of Fig. 1.

Figure 3:
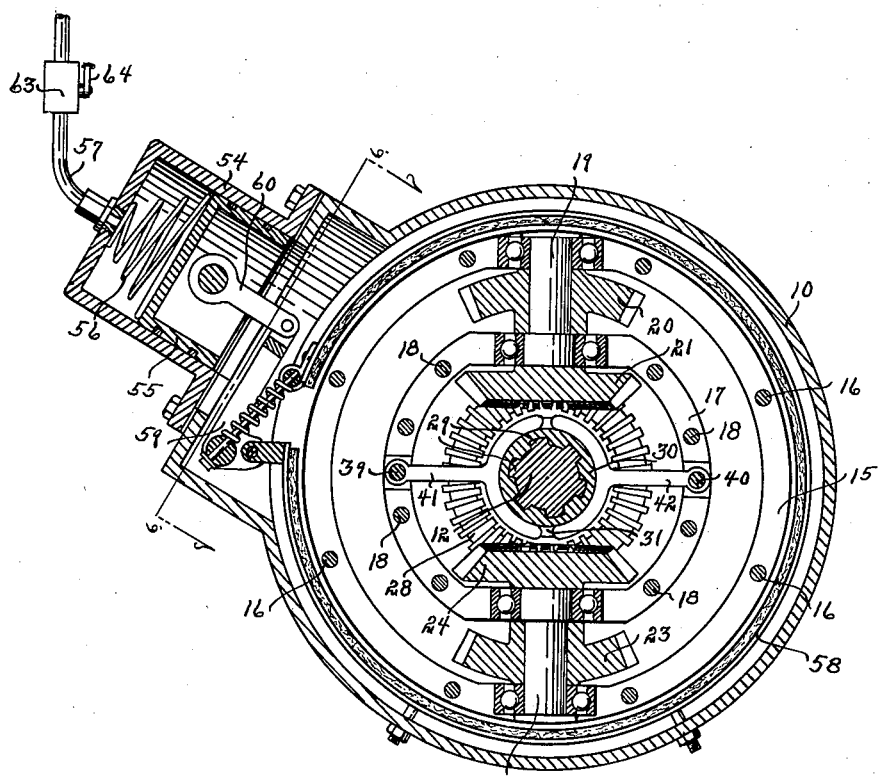
Fig. 3 is a cross-sectional view of my transmission taken on the line 3—3 of Fig. 1 and more fully illustrates its construction.

Transmissions now in general use are usually of two types, i. e., ones that require the disengaging of the clutch during the gear changing function and the manual movement of a gear shifting lever during the time the clutch is disengaged, and the ones that deliver a progressive uninterrupted power from "low" to "high" gear. The first type is objectionable in that there is no transmission of power from the motor to the vehicle traction wheels during the gear shifting operation and the second type is objectionable in that the operator of the vehicle has little if any control in the selection of the gear at certain given times.

I have overcome such objections by providing a semi-automatic positive transmission that relieves much of the usual work required by the operator of the vehicle, but at the same time makes possible the positive control of the transmission by the operator at all times.

Referring to the drawings, I have used the numeral 10 to generally designate the transmission housing. The numeral 11 designates a shaft journaled in one end of the housing 10. This shaft 11 is designed to have its outer end operatively connected to the traction wheels of the vehicle using my transmission. The numeral 12 designates the main shaft of my transmission designed to be operatively secured to the prime mover of the vehicle at times. This shaft 12 extends substantially longitudinally through the housing 10 and has one of its end portions journaled in the other or front end of the housing 10 and its other end portion journaled in the inner end of the shaft 11, as shown in Fig. 2. Around these shafts 11 and 12 and inside the housing 10, I have rotatably mounted a cage housing, the rear end portion 13 being rotatably mounted around the inner end of the shaft 11 and the forward end portion 14 being rotatably mounted around the shaft 12. The numeral 15 designates the two sectional barrel or central portion of the cage and extends between the two end portions 13 and 14. The cage is capable of being disassembled by cap bolts 16 which detachably secure the end portion 14 to the portion 15 and the two split sections of the portion 15 together.

The numeral 17 designates a drum secured to the inside of the end portion 14 by the cap bolts 18. These bolts also hold the two sections of the drum together. By the barrel portion 15 and the drum each being of two sections they may be disassembled for repair, inspection, and to detachably hold the various bearings. As shown in Fig. 3, the drum 17 is spaced apart from the inside of the barrel portion 15. The numeral 19 designates a radially positioned shaft journaled in the barrel and drum and extending between them. The numeral 20 designates a bevel gear secured on the shaft 19 and positioned between the barrel 15 and drum 17, as shown in Fig. 1. The numeral 21 designates a bevel gear secured on the inner end of the shaft 19 and positioned inside the drum 17. The numeral 22 designates a second radial shaft journaled in the barrel portion 15 and the drum 17 and extending between them. This shaft is diametrically positioned relative to the shaft 19. The numeral 23 designates a bevel gear secured to the shaft 22 and positioned between the barrel portion and drum. The numeral 24 designates a bevel gear on the inner end of the shaft 22 and positioned inside the drum 17. The shaft 19 and bevel gears 20 and 21 are duplicates of the shaft 22, and bevel gears 23 and 24, respectively. The bevel gears 20, 21, 23, and 24 are of substantially the same diameters. The numeral 25 designates an external toothed member integrally formed on the inner end of the shaft 11 and inside the housing 10. Rigidly secured by suitable means to the inner side of this toothed member is a large bevel gear 26 having a diameter substantially larger than the bevel gears hereinbefore mentioned. This gear 26 is in mesh with the two gears 20 and 23.

Figure 4:
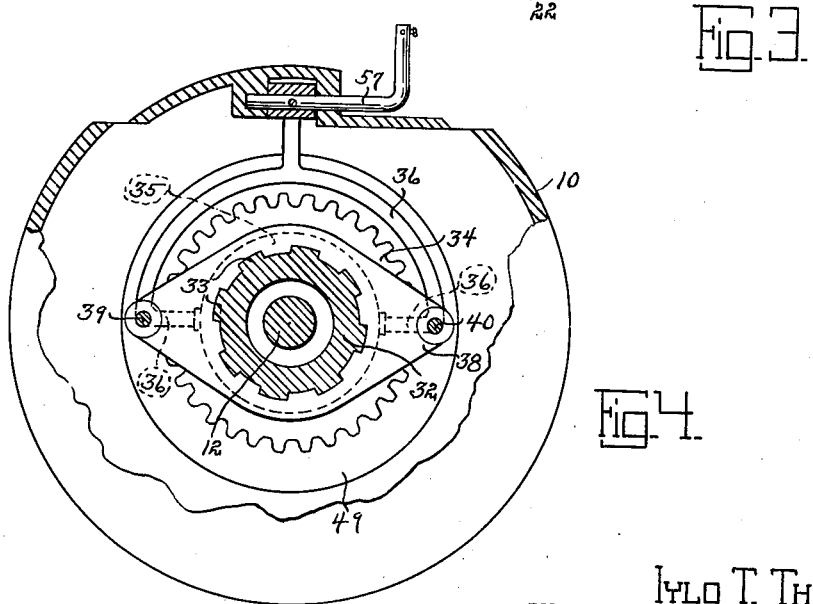
Fig. 4 is a cross-sectional view of the transmission taken on the line 4—4 of Fig. 1.

The numeral 27 designates a gear having external bevel gear teeth and internal clutch teeth rotatably mounted on the shaft 12 and rotatably mounted in the end portion 14. This gear 27 has its bevel gear teeth in mesh with the two gears 21 and 24. The numeral 28 designates a similar gear having external bevel gear teeth and internal clutch teeth rotatably mounted on the shaft 12 and rotatably mounted in the wheel 25 and bevel gear 26, as shown in Fig. 2. This gear 28 has its bevel gear teeth in mesh with the two bevel gears 21 and 24 at diametrical locations from the meshing of the gear 27 with these two gears. By this arrangement of gears the gears 27 and 28 will be spaced apart and face each other and the gears 21 and 24 will be spaced apart and face each other. The numeral 29 designates splined teeth on that part of the shaft 12 extending between the bevel gears. The numeral 30 designates a splined sleeve slidably mounted around the teeth 29 on the shaft 12 and between the gears 27 and 28. This sleeve 30 has external teeth on one of its end portions capable of engaging the internal clutch teeth of the gear 27 when slid toward the gear 27, and external teeth on its other end portion capable of engaging the internal clutch teeth of the gear 28 when slid toward the gear 28. The numeral 31 designates a continuous peripheral groove in the sleeve 30. The numeral 32 designates a forwardly extending cylinder on the end portion 14 loosely embracing the shaft 12. The numeral 33 designates external spline teeth on this cylinder. The numeral 34 designates a spur toothed member slidably splined on the teeth 33 and around the shaft 12. The numeral 35 designates a continuous peripheral groove on the hub portion of the member 34. The numeral 36 designates a fork member pivoted at its upper end to the inside of the housing 10 and having its lower two end portions extending into and engaging the peripheral groove 35 at points diametrically opposite from each other, as shown in Fig. 4.

The numeral 57 designates an L-arm having one of its ends connected to the fork 36 and its other end extending out of the housing 10. By this construction when the arm 37 is rotatably moved in one direction the member 34 will be forced toward the end portion 14 and when rotatably moved in the other direction the member 34 will be moved away from the end portion 14. The numeral 38 designates a plate integrally formed on the rear end of the hub of the member 34. The numerals 39 and 40 designate two rods secured to the plate 38 and extending rearwardly and slidably through the end portion 14. These two rods 39 and 40 are spaced apart and extend at each side of the plane of the shafts 19 and 22, respectively. The numeral 41 designates a fork secured to the rear end of the rod 39 and extending radially inwardly to slidably engage the peripheral groove 31. The numeral 42 designates a similar fork secured to the rear end of the rod 40 and extending radially inwardly to slidably engage the peripheral groove 31 at a point diametrically opposite from the point of engagement of the fork 41 with the groove 31, as shown in Fig. 4. By this arrangement, when the member 34 is slid on the member 32 the sleeve 30 will accordingly be slid on the teeth 29 of the shaft 12. The numeral 43 designates internal teeth on the inside rear portion of the barrel 15, as shown in Fig. 2. These teeth 43 surround the teeth of the member 25, but are spaced apart from the same. The numeral 44 designates a plurality of clutch plates arranged on, around, and engaging the external teeth of the member 25 in the usual manner. The numeral 45 designates a plurality of clutch plates arranged on and engaging the internal teeth 43. The clutch plates 44 are alternately positioned with the clutch plates 45 according to common practice and as shown in Fig. 2.

This clutch plate assembly consisting of the plates 44 and 45 are adjacent the end portion 13 of the cage. The numeral 46 designates the clutch plates' depressing ring adjacent the other side of the clutch plate assembly capable of being moved toward the clutch plates for causing the clutch plates to slide in close contact with each other and toward the end portion 13 for frictionally yieldingly connecting the cage portion of the transmission with the wheel 25 at times. The numeral 47 designates a plurality of governor weights each pivoted between their two ends to the barrel portion 15. Each of these governor weights have their inner light end portions extending into the side of the barrel portion 15 and engaging the ring 46, as shown in Fig. 1. The weighted end portion of each of the governor weights 47 are yieldingly held toward the cage portion of the transmission by coil springs 48. By this construction the coil springs 48 will, when the cage is not rotating, hold the lighter ends of the governor weights away from the ring 46, thereby permitting the clutch plates to be loosely arranged relative to each other and disconnecting the cage portion from the wheel 25. When the cage portion of the device is rotating the weighted ends of the governor weights will move outwardly against the action of the springs 48 by centrifugal force, thereby forcing the ring 46 toward the end portion 13 and clamping the clutch plates in tight arrangement relative to each other and thereby locking the cage portion of the device with the toothed member 25. The numeral 49 designates a brake ring plate rigidly secured to the inside forward end of the housing 10 and loosely embracing the shaft 12. This plate has internal notches 50 formed in its inner periphery. Each of these notches 50 have one of their sides extending approximately in a radial line and their other sides extending at an angle from the extreme bottom of the notch to the inside periphery of the plate, as shown in Fig. 7.

The numeral 51 designates a brake hub portion rigidly secured on and around the portion 32, as shown in Fig. 2. This member 51 is spaced apart inside the member 49. The numeral 52 designates a wedge roller loosely mounted in each of the notches 50. By this arrangement, the cage portion of the device may rotate to the right and in the same direction of rotation as the shaft 12, but cannot rotate to the left or in a direction opposite from the direction of rotation of the shaft 12. The reason for this is that when the member 51 is rotated to the right the wedge rollers 52 will move into the extreme bottoms of the notches 50, thereby permitting the free rotation of the member 51, but if for any reason the member 51 were to have a tendency to rotate in a direction opposite from the direction of rotation of the shaft 12, the wedge rollers would tend to move to the left with the member 51, thereby moving them into wedge relationship between the member 51 and member 49, thereby preventing rotation of the cage to the left. The numeral 53 designates an internal toothed gear rigidly secured to the member 49 and capable of receiving and engaging the teeth of the member 34 when the member 34 is moved forwardly. The numeral 54 designates a cup cylinder having one end communicating with the inside of the housing 10 and adjacent the barrel portion 15. The numeral 55 designates a piston slidably mounted in the cylinder 54. The numeral 56 designates a spring inside the cylinder 54 having one end engaging the inside top of the cylinder and its other end engaging the piston 55 for yieldingly holding the piston toward the barrel portion 15. The numeral 57 designates a pipe having one of its ends communicating with the inside top of the cylinder 54 and its other end designed to be in communication with the suction intake manifold of the internal combustion motor of the vehicle on which my transmission is installed. The numeral 63 designates a valve imposed in the pipe 57 manually operated by the control rod 64.

The numeral 58 designates a brake band embracing the barrel portion 15. The numeral 59 designates an ordinary brake band cam lever operatively secured in the usual manner to the two ends of the brake band 58, as shown in Fig. 3. The numeral 60 designates a link connecting the free end of the cam lever 59 with the piston 55. By this construction, when the piston 55 is moved outwardly in the cylinder 54, the brake band 58 will be tightened, thereby yieldingly preventing the rotation of the cage of the transmission and when the piston 55 is moved toward the barrel 15 the brake band will be loosened on the barrel 15, thereby permitting its rotation. The numeral 61 designates a manual means to facilitate the actuation of the member 37.

The practical operation of my device is as follows: When my transmission is in "neutral" the various elements will be in positions as shown in Fig. 1. The toothed sleeve 30 will neither be in engagement with the gear 27 or 28 and the member 34 will be out of engagement with the rigidly held internal toothed member 53. To place the transmission in "low" gear it is merely necessary to manually actuate the control 61 to move the fork 36 rearwardly, which in turn will move the member 34, rods 39 and 40, forks 41 and 42 rearwardly, thereby forcing the splined sleeve 30 on the shaft 12 rearwardly to a position where its teeth will engage the internal teeth of the gear 28. This will result in rigidly connecting the gear 28 to the shaft 12 and if the prime mover is rotating the shaft 12 and the gear 28 will likewise rotate to the right. As the gear 28 is in mesh with the bevel gears 21 and 24 the shafts 19 and 22 will be rotated thereby, which in turn will rotate the bevel gears 20 and 23.

As the cage of the transmission is stationary and cannot rotate in a direction opposite from the direction of rotation of the shaft 12 due to the wedge rollers 52, the comparatively large bevel gear 26 will be forced to rotate also to the right, but due to the reduced gear ratio will rotate much slower than that of the rotation of the shaft 12. As this gear 26 is rigidly secured to the driven shaft 11, the shaft 11 will rotate to the right and at a reduced speed from the speed of rotation of the drive shaft 12 and "low" gear will result.

Due to the planetary phase of my transmission it is obvious that when the transmission is in gear and the shaft 12 rotating either the gears 20 and 23 will drive the large gear 26, or the large gear 26 will remain stationary and the bevel gears 20 and 23 will race around and on the large gear 26. If, however, the gear 26 were connected to the planetary cage of the transmission the gears 20 and 23 with the gear 26 would rotate with the shaft 12 as a unit and "high" gear would result inasmuch as the shaft 11 would be thereby connected to the shaft 12 and would rotate with and at the same speed as the shaft 12. With the shaft 11 offering resistance to rotation the tendency of course will be for the gear 26 to remain stationary and the cage to rotate around the shaft 12 in a direction opposite from the direction of rotation of the shaft 12. This, however, is prevented as we have seen, by the wedge rollers 52. From this it will readily be seen that my transmission will remain in "low" gear and will not automatically go into "high" gear until it is desired that it do so by the operator of the vehicle and this regardless of the speed of rotation of the shaft 12.

To place the transmission in a higher gear from "low" gear it is merely necessary to release the fuel foot feed of the motor, thereby causing the motor to idle momentarily. The driven shaft thus temporarily becomes the driving shaft, the motor acting as a brake to retard vehicle movement. Under these circumstances torque is transmitted from the gear 26 through the planet gears to the gear 28, and if the cage remained stationary, the ratio of the transmission would be greater than unity, owing to the fact that the gear 26 is of greater diameter than the gear 28. It will be observed, however, that the gearing is capable of operating at the lower ratio of unity, the cage rotating in a clockwise direction at the speed of the driven shaft 11, the planet gears 20 and 21 partaking of no movement on their own axes. Since a gear train always functions to transmit torque at the lowest speed ratio of which it is capable, the cage will be caused to rotate in a clockwise direction, in which direction of rotation the one-way brake 52 is inoperative. With the cage rotating the governor weights 47 will be moved outwardly by centrifugal force, thereby moving the ring 46 toward the end portion 13 and frictionally connecting all of the clutch plates. With the clutch plates definitely engaging each other the cage portion will be definitely connected to the shaft 11 and "high" gear will result with the shafts 11 and 12 rotating at the same speed and with the shaft 12 now acting as the drive shaft and the shaft 11 as the driven shaft.

To place the transmission in "reverse" it is merely necessary to actuate the hand mechanism to bring the fork 36 forwardly, causing the member 34 to move into engagement with the internally toothed member 53, thereby locking the cage against rotation in any direction and moving the splined sleeve 30 forwardly to a position where its teeth engage the bevel gear 27. When the gears are in such mesh the bevel gear 27 will be rotated to the right with the shaft 12. As the gear 27 is in mesh with the bevel gears 21 and 24 the bevel gear 26 will be rotated in a direction opposite from that of the rotation of the shaft 12. Obviously, the shaft 11 will thereby be rotated in a "low reverse" rotation from that of the rotation of the shaft 12.

To place the transmission in "neutral" gear it is merely necessary to actuate the hand mechanism 61 to a "neutral" position where the fork 36 is in position as shown in Fig. 2, and the splined sleeve 30 is in a position where it is neither in mesh with the gear 28 or the gear 27. Whenever the cage is slowed down in its rotation or stopped from rotating, the governor weights 47 will naturally be actuated by the springs 48 against centrifugal force and the clutch plates 44 and 45 will be released from engagement with each other.

There are times when the operator of the vehicle will wish the transmission to be in "low" gear regardless of the speed of the vehicle. In order to prevent the transmission from going into "high" gear under any circumstance it is merely necessary to manually connect the tube 57 with the manifold or suction side of the motor by actuating the valve 63. This suction will move the cylinder 55 outwardly and tighten the band 58 on and around the cage thereby preventing its free rotation relative to the housing 10. Obviously with the cage 15 prevented from rotation the transmission will remain in "low" gear. With the valve 63 closed the band 58 will release the cage for rotation. To cause the car to go from "high" gear into "low" gear, it is merely necessary to manually actuate the valve 63.

Some changes may be made in the construction and arrangement of my improved automatic transmission without departing from the real spirit and purpose of my invention, and it is my intention to cover by my claims any modified forms of structure or use of mechanical equivalents which may be reasonably included within their scope.

I claim:

1. In a device of the class described, a shaft, a second shaft, a bevel gear rigidly secured to said second shaft, a cage element rotatably mounted around said first and second shafts, a radial shaft rotatably mounted in said cage, a bevel gear rigidly secured on said radial shaft and in engagement with said first mentioned bevel gear, a second bevel gear rigidly secured on said radial shaft, a bevel gear loosely rotatably mounted on said first mentioned shaft and in engagement with said last mentioned bevel gear, a means for rigidly securing said loosely rotatably mounted bevel gear to said first mentioned shaft at times, clutch mechanism operatively connected to said cage and to said first mentioned bevel gear, a centrifugally operated governor means on said cage capable of actuating said clutch mechanism when said cage is rotated, a brake band loosely embracing said cage, and a means for tightening said brake band on said cage at times.

2. In a device of the class described, a shaft, a second shaft, a bevel gear rigidly secured to said second shaft, a cage element rotatably mounted around said first and second shafts, a radial shaft rotatably mounted in said cage, a bevel gear rigidly secured on said radial shaft and in engagement with said first mentioned bevel gear, a second bevel gear rigidly secured on said radial shaft, a bevel gear loosely rotatably mounted on said first mentioned shaft and in engagement with said last mentioned bevel gear, a means for rigidly securing said loosely rotatably mounted bevel gear to said first mentioned shaft at times, clutch mechanism operatively connected to said cage and to said first mentioned bevel gear, a centrifugally operated governor means on said cage capable of actuating said clutch mechanism when said cage is rotated, a brake band loosely embracing said cage, a means for tightening said brake band on said cage at times, and a means for preventing the rotation of said cage in a direction opposite from the direction of rotation of said first mentioned shaft.

3. In a device of the class described, a shaft, a second shaft, a bevel gear rigidly secured to said second shaft, a cage element rotatably mounted around said first and second shafts, a radial shaft rotatably mounted in said cage, a bevel gear rigidly secured on said radial shaft and in engagement with said first mentioned bevel gear, a second bevel gear rigidly secured on said radial shaft, a bevel gear loosely rotatably mounted on said first mentioned shaft and in engagement with said last mentioned bevel gear, a means for rigidly securing said loosely rotatably mounted bevel gear to said first mentioned shaft at times, clutch mechanism operatively connected to said cage and to said first mentioned bevel gear, a centrifugally operated governor means on said cage capable of actuating said clutch mechanism when said cage is rotated, a brake band loosely embracing said cage, a cylinder, a piston slidably mounted in said cylinder, a means for connecting said piston to said brake band for tightening said brake band on said cage when said piston is moved outwardly in said cylinder, and a hollow element having one end communicating with the inside outer end of said cylinder and its other end designed to be in communication with a source of suction at times.

4. In a device of the class described, a shaft, a second shaft, a bevel gear rigidly secured to said second shaft, a cage element rotatably mounted around said first and second shafts, a radial shaft rotatably mounted in said cage, a bevel gear rigidly secured on said radial shaft and in engagement with said first mentioned bevel gear, a second bevel gear rigidly secured on said radial shaft, a bevel gear loosely rotatably mounted on said first mentioned shaft and in engagement with said last mentioned bevel gear, a means for rigidly securing said loosely rotatably mounted bevel gear to said first mentioned shaft at times, clutch mechanism operatively connected to said cage and to said first mentioned bevel gear, a centrifugally operated governor means on said cage capable of actuating said clutch mechanism when said cage is rotated, a brake band loosely embracing said cage, and a suction operated mechanism operatively connected to said brake band for tightening said brake band on said cage at times.

5. In a selective change speed gearing for motor vehicles, the combination with driving and driven shafts, of a planetary gear train for connecting said shafts, said gear train including a bevel gear secured to said driven shaft, a planet carrier, a planet element supported by said carrier and meshing with said bevel gear, a second bevel gear coaxial with said planet element and secured thereto, a pair of bevel gears supported coaxially with said driving shaft for meshing relation with said second bevel gear at opposite sides thereof, clutch means for selectively coupling either of said last named bevel gears to said driving shaft to effect reversal of the direction of rotation of said driven shaft, one way brake means resisting rotation of said carrier in a direction reverse to the direction of rotation of said driving shaft, and centrifugal clutch means responsive to rotation of said carrier to couple the latter to said driven shaft and thereby lock said planetary gear train for rotation as a rigid unit.

6. In a selective change speed gearing for motor vehicles, the combination with driving and driven shafts, of a planetary gear train for connecting said shafts, said gear train including a bevel gear secured to said driven shaft, a planet carrier, a planet element supported by said carrier and meshing with said bevel gear, a second bevel gear coaxial with said planet element and secured thereto, a pair of bevel gears supported coaxially with said driving shaft for meshing relation with said second bevel gear at opposite sides thereof, clutch means for selectively coupling either of said last named bevel gears to said driving shaft to effect reversal of the direction of rotation of said driven shaft, one way brake means resisting rotation of said carrier in a direction reverse to the direction of rotation of said driving shaft, and centrifugal clutch means responsive to rotation of said carrier to couple the latter to said driven shaft and thereby lock said planetary gear train for rotation as a rigid unit, and fluid controlled brake means operable to retard rotation of said planet carrier.

7. In a selective change speed gearing for motor vehicles, the combination with aligned driving and driven shafts, of a planetary gear train for connecting said shafts, said gear train including planet gear means, a planet carrier supporting said planet gear means, a pair of gears supported coaxially with said driving shaft for meshing relation with said planet gear means at opposite sides thereof, means for selectively rendering either of said last named gears operative to drive said planet gear means from said driving shaft, a gear secured to said driven shaft for meshing engagement with said planet gear means, brake means operable to retard the rotation of said planet carrier, and one-way brake means locking said carrier against rotation in a direction reverse to the direction of rotation of said driving shaft.

8. In a selective change speed gearing for motor vehicles, the combination with aligned driving and driven shafts, of a planetary gear train for connecting said shafts, said gear train including planet gear means, a planet carrier supporting said planet gear means, a pair of gears supported coaxially with said driving shaft for meshing relation with said planet gear means at opposite sides thereof, means for selectively rendering either of said last named gears operative to drive said planet gear means from said driving shaft, a gear secured to said driven shaft for meshing engagement with said planet gear means, means operable to prevent rotation of said planet carrier in one direction, and means responsive to rotation of said planet carrier to lock said gear train for rotation as a unit.

9. In a selective change speed gearing for motor vehicles, the combination with driving and driven shafts, of a planetary gear train connecting said shafts, said gear train including a driving gear operatively connected to said driving shaft, a driven gear operatively connected to said driven shaft, a rotatable planet carrier, planet gear means supported by said carrier and meshing with said driving and driven gears, one-way brake means for preventing rotation of said carrier in one direction, fluid operable brake means for retarding rotation of said carrier in the other direction, connections between said last named brake means and the motor fuel supply conduit, and centrifugal clutch means operable in response to rotation of said carrier in the other direction to couple said carrier and said driven gear for unitary rotation.

10. In a selective change speed gearing for motor vehicles, the combination with driving and driven shafts, of a planetary gear train for connecting said shafts, said train including a reactive rotatable member, fluid controlled brake means for resisting rotation of said reactive member to afford a fulcrum for said gear train, fluid connections between said brake means and the motor fuel supply conduit, and means including a centrifugally operated device responsive to rotation of said reactive member in the other direction to lock said gear train for rotation as a unit.

11. In a selective change speed gearing for motor vehicles, the combination with driving and driven shafts, of a planetary gear train for connecting said shafts, said gear train including a bevel gear secured to said driven shaft, a planet carrier, a planet element supported by said carrier and meshing with said bevel gear, a second bevel gear coaxial with said planet element and secured thereto, a pair of bevel gears supported coaxially with said driving shaft for meshing relation with said second bevel gear at opposite sides thereof, clutch means for selectively coupling either of said last named bevel gears to said driving shaft to effect reversal of the direction of rotation of said driven shaft, brake means for resisting rotation of said carrier, and centrifugal clutch means responsive to rotation of said carrier to lock said planetary gear train for rotation as a rigid unit.

12. In a selective change speed gearing for motor vehicles, the combination with driving and driven shafts, of a planetary gear train for connecting said shafts, said train including a reactive rotatable member, means responsive to rotation of said reactive member to lock said gear train for rotation as a unit, fluid controlled brake means for resisting rotation of said reactive member to afford a fulcrum for said gear train, and fluid connections between said brake means and the motor fuel supply conduit.

IYLO T. THOMPSON.